Patented Mar. 30, 1926.

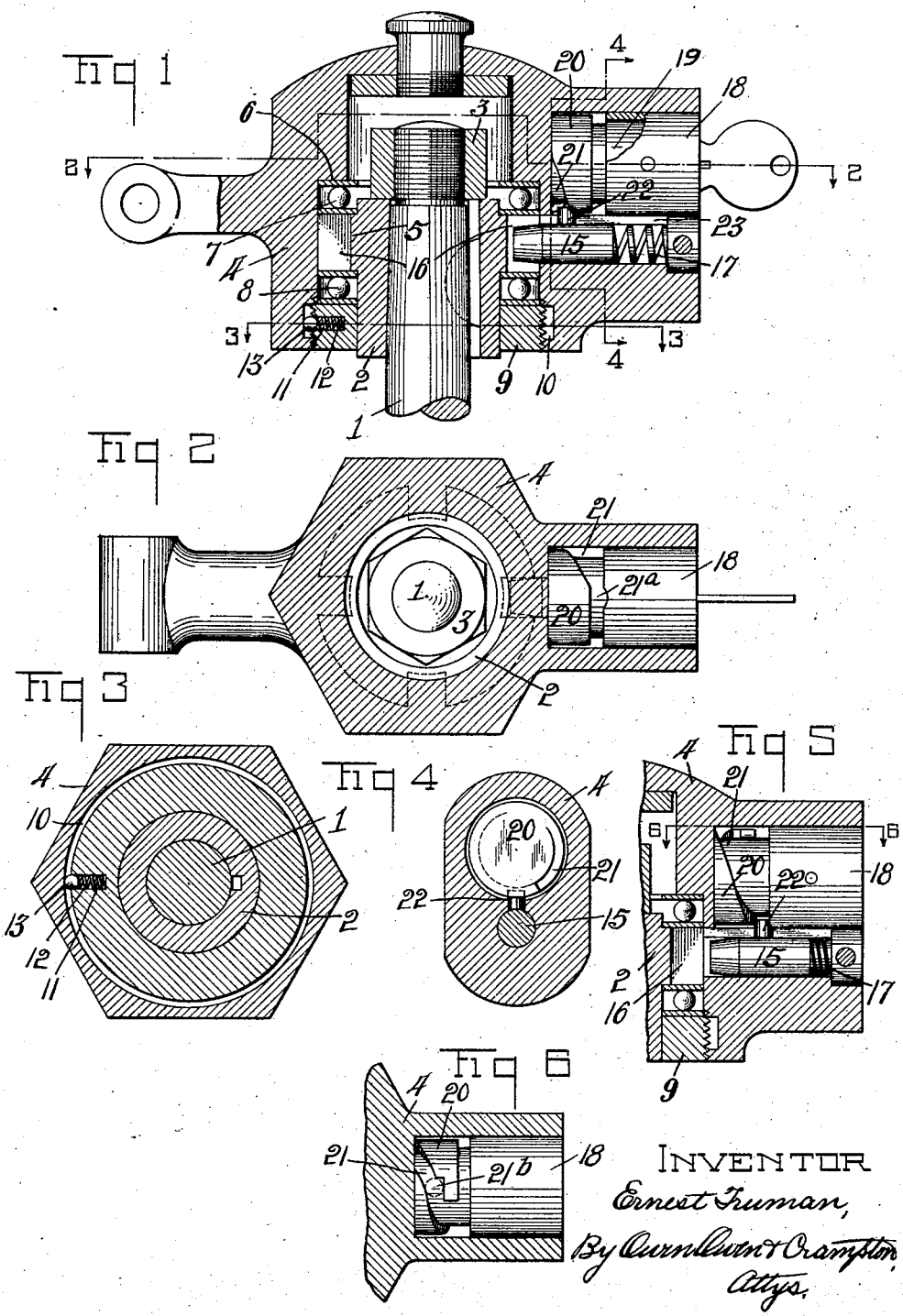

1,578,782

UNITED STATES PATENT OFFICE.

ERNEST TRUMAN, OF TOLEDO, OHIO, ASSIGNOR TO FOX AUTOMOTIVE PRODUCTS CORPORATION, OF PHILADELPHIA, PENNSYLVANIA, A CORPORATION OF DELAWARE.

STEERING-WHEEL LOCK.

Application filed November 8, 1923. Serial No. 673,417.

*To all whom it may concern:*

Be it known that I, ERNEST TRUMAN, a citizen of the United States, and a resident of Toledo, in the county Lucas and State of Ohio, have invented a new and useful Steering-Wheel Lock, which invention is fully set forth in the following specification.

This invention relates to steering wheel locks and has for its object the provision of a simple and improved key controlled locking means which is operable by a turning of the control key to effect a positive projection of the locking bolt into position to lock the wheel to its post, or a positive retraction of the same as may be desired, so that the bolt is not dependent on the action of the spring for either of such purposes, the bolt being also positively locked against movement in either direction except when the key is turned to effect a movement thereof.

In a number of steering wheels of the type in which the steering wheel is adapted to be released for free turning movements on the post, the wheels are secured on the steering post hub by a retaining ring which is usually screwed up into the hub portion of the wheel in engagement with a stop bearing or shoulder on the post hub to prevent a removal of the wheel hub from the post hub and the ring is then pinned or otherwise rigidly locked to the wheel hub. The ring when so locked cannot be adjusted to take up wear or play until the locking pin has been drilled out, thus necessitating removing the steering post and wheel from the machine and taking them to a shop to remove the pin. This is not only expensive, but takes considerable time.

An object of my invention is to overcome this difficulty by the provision of simple and efficient means to secure a locking ring against removel from a wheel hub and which at the same time will permit adjustment of the ring within predetermined limits to compensate for wear or to take up play in the wheel hub bearing.

The invention is fully described in the following specification, and while in its broader aspect it is capable of embodiment in numerous forms, a preferred embodiment thereof is illustrated in the accompanying drawings, in which,—

Figure 1 is a central vertical section of a steering wheel hub and post hub embodying the invention with the locking means for preventing a relative turning of the two hubs in locked or projected position. Fig. 2 is a cross-section thereof on the line 2—2 in Fig. 1. Fig. 3 is a cross-section thereof on the line 3—3 in Fig. 1. Fig. 4 is a vertical section thereof on the line 4—4 in Fig. 1. Fig. 5 is a fragmentary section similar to Fig. 1 with the bolt retracted, and Fig. 6 is a section taken on the line 6—6 in Fig. 5.

Referring to the drawings, 1 designates the upper end portion of a steering post, 2 a hub or collar keyed thereon and prevented from removal therefrom by a nut 3 on the upper end of the post, and 4 a steering wheel hub preferably made of cup form to fit down over the upper end of the post and its hub member.

The post hub 2 is provided near its upper end with an annular shoulder 5 and between the upper side of this shoulder and a shoulder 6 within the wheel hub 4 is disposed an anti-friction bearing means 7, as well understood in the art. A similar anti-friction bearing means 8 is disposed between the lower side of the shoulder 5 and a retaining ring 9 that is intended to be screwed up into the open end of the wheel hub cavity. It is evident that the ring 9 is properly adjusted in the wheel hub to permit a free turning of the wheel hub on the post hub 2 without permitting play or looseness between the parts.

The interior of the wheel hub 4 near its outer end, or within the portion thereof which is exposed to the peripheral portion of the ring 9 when screwed therein, is provided with an annular groove 10 preferably disposed intermediate the ends of the threaded portion of the hub into which the ring is screwed. The ring is provided at a pont in its periphery with a socket 11 having a coiled expansion spring 12 therein bearing outward against a ball or detent member 13 to normally press said member out into the groove 10. The ball or detent member 13 is intended to turn in the groove 10 with the ring 9 and the groove is of suitable width to permit a predetermined lateral movement of the detent member axially of the hub. It is evident that the detent 13 when within the groove 10 positively locks the ring against removal from the wheel hub but permits a turning and axial adjustment of the ring within a predetermined range to allow for an adjustment thereof to compensate for wear and to take up play between the parts which occurs during use.

The ring 9 is provided on its outer end with some mark indicating the position of the ball or detent member 13 so that when an authorized person desires to completely remove the ring from the wheel hub a hole may be drilled into the side of the hub in register with the detent member to enable a tool to be inserted into the hole for pressing the detent member inwardly into released position with respect to the outer wall of the groove 10.

The wheel hub 4 on one side thereof carries a radially movable bolt 15 which, when in locked position, enters a registering notch 16 in the shoulder 9 of the post hub, one or more of such notches being provided for the purpose. A compression spring 17 is preferably disposed in the wheel hub socket or recess in which the bolt works and has its inner end thrust against the bolt to normally urge a locking movement thereof. A lock barrel 18 is mounted in a cavity provided radially in the wheel hub at one side of the bolt 15 and a key controlled lock cylinder 19 is mounted in the barrel for turning movements therein and is provided with an extension 20 at its inner end. This extension is peripherally grooved to provide a spiral raceway 21 therein into which a pin 22 on a side of the bolt 15 projects. This pin projects through a longitudinal slot 25 provided in the wheel hub 4 between the recesses in which the bolt 15 and key controlled locking means are respectively mounted and projects a sufficient distance into the latter recess to enter the raceway 21 of the lock part 20.

When the bolt 15 is in the retracted or interlocked position shown in Fig. 5, the pin 22 is disposed at a point 21ª (Fig. 2) in the raceway in engagement with opposed walls of the raceway so that the bolt is positively locked against movement in either direction until the lock means 19, 20 is turned. Upon such turning the pin 22 follows the inclined or spiral inner wall of the raceway 21, being held thereagainst by the action of the spring 17 and when the bolt is in complete projected position the pin stands at a point 21ᵇ (Fig. 6) in the raceway where it is positively engaged by two opposed walls of the raceway to positively prevent movement of it and the bolt in either direction until the lock means is turned for such purpose. It is evident that the bolt is not dependent on the action of a spring to hold it in the projected or wheel hub locking position. This is an important feature, for if the holding of the bolt in locking position was dependent on the action of a spring and the spring should break during the driving of the associated car, the bolt might move free from engagement with the post hub, rendering the steering mechanism of the car uncontrollable and possibly resulting in a serious accident.

I wish it understood that my invention is not limited to any specific construction, arrangement or form of the parts, as it is capable of numerous modifications and changes without departing from the spirit of the claims.

Having thus described my invention, what I claim as new and desire to secure by Letters Patent, is,—

1. A steering wheel hub member and a retaining ring member threaded for axial adjustment in the hub member, one of said hub and ring members having an annular groove opening to the other, and means carried by the other of said members and releasably projecting into the groove to coact with a wall thereof to prevent a removal of the ring member from the hub member and at the same time permitting predetermined axial adjustment of one member relative to the other.

2. A steering wheel hub having an internal annular groove, a retaining ring for threading into the hub across the groove, and releasable detent means carried by the ring for engagement with the wall of the groove to prevent removal of the ring from the hub, the groove being wider than the detent to permit limited axial adjustment of the ring in the hub.

In testimony whereof I have hereunto signed my name to this specification.

ERNEST TRUMAN.